Jan. 19, 1932.                O. RIETMANN                1,842,288
                            CUTTING ATTACHMENT
                            Filed May 15, 1929
Fig. 1.
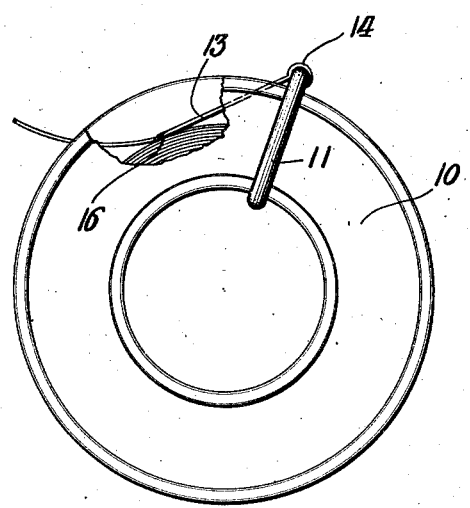
Fig. 2.
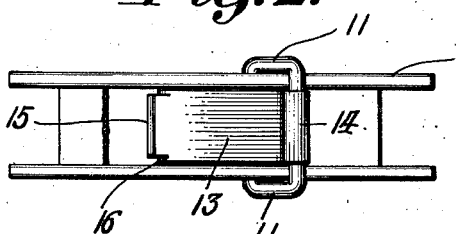
Fig. 4.                                                Fig. 5.
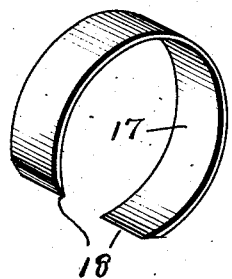 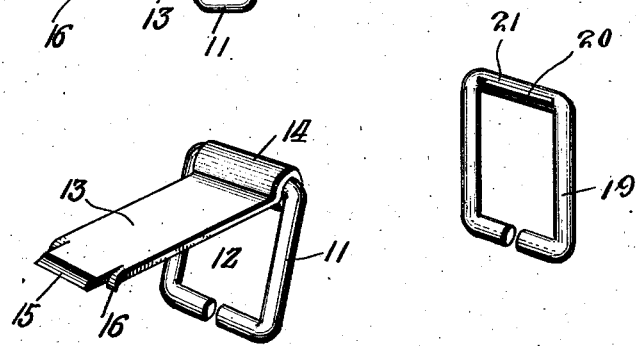
Fig. 3.
Omar Rietmann,
INVENTOR
BY Victor J. Evans
ATTORNEY Patented Jan. 19, 1932

1,842,288

UNITED STATES PATENT OFFICE

OMAR RIETMANN, OF IONE, OREGON

CUTTING ATTACHMENT

Application filed May 15, 1929. Serial No. 363,335.

This invention relates to new and useful cutting elements primarily designed for use upon spools, drums and the like.

An object of the invention contemplates the provision and arrangement of means whereby the cutting element is disposed for action as the material is paid out from the reel or drum and to sever same at any desired length.

Another object of the invention comprehends a supporting structure for the cutting element.

An additional object of the invention consists of holding means for the cutting element whereby the latter will be sustained in position for use.

With the above and other objects in view, the invention further consists of the following novel features and details of construction, to be hereinafter more fully described, illustrated in the accompanying drawings and pointed out in the appended claim.

In the drawings:—

Figure 1 is a side elevation of a spool or drum structure with the invention applied and partly broken away to illustrate the relative arrangement thereof.

Figure 2 is a top plan view of the reel with the invention applied.

Figure 3 is a perspective view of the invention per se.

Figure 4 is a perspective view of a modified form of my invention.

Figure 5 is a view similar to both Figures 3 and 4 of an additional modification of my invention.

Referring to the drawings in detail wherein like characters of reference denote corresponding parts, the reference character 10 indicates generally a reel, spool or drum as employed by the manufactures of adhesive tapes and other dressings sold in rolled form.

The invention comprises a link 11 preferably of the square type and split to facilitate accommodation of the spool, drum or reel within the enclosure 12 defined thereby. Said link is made large enough to slide around and about the flanged sides of the reel. The cutting element, as mentioned in the foregoing, consists of a blade 13 of elongated configuration forming a bearing sleeve 14 horizontally disposed upon one end thereof to journal the adjacent yoke portion of the link 11 in the manner as best illustrated in Figure 3 of the drawings whereby the blade may swing therefrom to dispose a cutting edge 15, ground upon its opposite end in juxtaposition to the tape or other material wound upon the reel structure. Stops or penetrating elements, in the nature of prongs 16, carried by and projecting from the blade 13 beyond the sharpened edge thereof, are adapted for biting engagement with the tape or other material in the manner shown in Figure 1 of the drawings whereby retrograde movement of the entire attachment will be retarded while the material is being severed by the cutting edge of the blade. In other words, I have combined an adhesive tape or other holder and means of cutting same which is generally done through the employment of scissors.

As the tape or other material is paid out from the reel, spool or drum, the blade will slide thereover after the manner of a dog upon a ratchet wheel or more likened to the weighted cutting blade carried by the conventional forms of racks and supports for wrapping paper in rolled form. The looseness in the fitting of the link about the body portion and side flanges of the reel structure will permit replacement of the attachment at any desired place thereon and may be canted for frictional locking engagement with the reel structure to compensate with the penetrating elements during the cutting operation.

The modified form of my invention as illustrated in Figure 4 of the drawings is in the nature of a split band designed to encompass or clamp about the material wound upon a spool. The clamping action of the band, however, may be such as to permit same in its entirety to be shifted around the roll of tape between the side flanges of the spool as the tape is paid out. The ends of the band 17, as shown, are spaced apart for an appreciable distance to permit the material to pass therebetween. Both extremities of the band are sharpened, as at 18, to accomplish severing of the tape and to always have an extra cutting edge in reserve. Obviously the band is grippingly engaged and compressed against the tape with one hand while the other hand is employed to reverse the unwrapping action of the tape to bring same against the adjacent cutting edge and to sever same at any desired length.

The second modification of my invention illustrated in Figure 5 of the drawing closely conforms to and resembles characteristically the formation and application of the link 11 as employed in the preferred form of my invention illustrated in Figures 1 to 3 inclusive. The distinction, as existing in the aforementioned modification over the preferred form resides in the fact that a cutting element is an inherent part thereof in contra distinction to the separate cutting blade 13. The link 19, as mentioned in the foregoing, is designed to be slided around and about the spool structure after the manner of the link 11 but which departs in the paying out and cutting action of the tape from the spool in the following manner. Instead of allowing the loose end of the tape to extend out and beyond the peripheral edges or side flanges of the spool, same is projected through an elongated slot 20 formed in the closed end of the link or yoke. The upper side edges 21 of the slot, at the ends thereof, are sharpened incident to the formation of the slot and against which the tape may be cut or severed when shifted at an oblique angle therefrom.

From the foregoing it is gathered and understood that several different forms of cutting devices are submitted, all of which relate to a particular type of cutter but each possesses distinctive advantages and therefore offers a selection to the buyer.

The invention is susceptible of various changes in its form, proportions and minor details of construction, and the right is herein reserved to make such changes as properly fall within the scope of the appended claim.

Having thus described the invention, what is claimed is:—

A cutting attachment for reel structures comprising a link encompassing the reel and swingably supported centrally thereof for sliding movement upon the outer marginal edges of the reel, a cutting element swingably supported upon that portion of the link extended over and between the marginal edges of the reel and disposing the opposite end in juxtaposition to the material wound about the reel, and prongs carried by and inwardly projected from the cutting element for biting engagement with the material to obviate lateral distortion of the cutting element while in use.

In testimony whereof I affix my signature.

OMAR RIETMANN.